(12) United States Patent
Yamazaki et al.

(10) Patent No.: US 7,818,280 B2
(45) Date of Patent: Oct. 19, 2010

(54) METHOD FOR PREDICTING DEPTH DISTRIBUTION OF PREDETERMINED WATER TEMPERATURE ZONE, METHOD AND SYSTEM FOR DELIVERING FISHING GROUND PREDICTION INFORMATION OF MIGRATORY FISH

(75) Inventors: Hidekatsu Yamazaki, Saitama (JP); Akiko Takano, Tokyo (JP)

(73) Assignee: National University Corporation Tokyo University of Marine Science and Technology, Tokyo (JP)

( * ) Notice: Subject to any disclaimer, the term of this patent is extended or adjusted under 35 U.S.C. 154(b) by 595 days.

(21) Appl. No.: 11/887,656

(22) PCT Filed: Mar. 27, 2006

(86) PCT No.: PCT/JP2006/306126
§ 371 (c)(1),
(2), (4) Date: Sep. 28, 2007

(87) PCT Pub. No.: WO2006/104087
PCT Pub. Date: Oct. 5, 2006

(65) Prior Publication Data
US 2009/0126254 A1    May 21, 2009

(30) Foreign Application Priority Data
Mar. 28, 2005 (JP) ............................. 2005-092593

(51) Int. Cl.
*G06F 15/18* (2006.01)
*G06F 17/00* (2006.01)
*G06F 17/10* (2006.01)
*G06F 7/60* (2006.01)
*G06N 5/04* (2006.01)
*A01K 69/00* (2006.01)
*A01K 71/00* (2006.01)
*A01K 73/00* (2006.01)
*A01K 75/00* (2006.01)
*A01K 79/00* (2006.01)

(52) U.S. Cl. ............................. 706/61; 706/930; 43/4.5; 703/2

(58) Field of Classification Search .................. 706/45, 706/47, 58, 61, 62, 928–931; 43/4, 4.5; 703/2
See application file for complete search history.

(56) References Cited

U.S. PATENT DOCUMENTS

| 2003/0056419 A1* | 3/2003 | Squires et al. ............... 43/4.5 |
| 2004/0162799 A1* | 8/2004 | Schisler et al. ............... 706/62 |
| 2005/0228581 A1* | 10/2005 | Taboada ..................... 701/200 |

FOREIGN PATENT DOCUMENTS

| JP | 2001-283189 | 10/2001 |
| JP | 2004-192231 | 7/2004 |

OTHER PUBLICATIONS

Ichikawa,K. et al. "Fluctuation of the Sea Surface Dynamic Topography Southeast of Japan as Estimated from Seasat Altimetry Data", Journal of Oceanography, vol. 48, pp. 155-177. 1992.*

(Continued)

*Primary Examiner*—Donald Sparks
*Assistant Examiner*—Benjamin Buss
(74) *Attorney, Agent, or Firm*—Staas & Halsey LLP

(57) ABSTRACT

A linear regression equation, $\eta 1 = \alpha(\epsilon \times h) + \beta$, is obtained based on a depth h to a water zone of a predetermined water temperature, respective densities $\rho 1$ and $\rho 2$ of upper and lower layers above and below the water zone, and an absolute dynamic topography $\eta 1$ obtained based on data measured by satellite ($\epsilon = (\rho 2 - \rho 1)/\rho 2$). Further, h' (depth of the water zone of the predetermined water temperature at each of a large number of spots) is determined according to this equation, $\eta 2 = \alpha(\epsilon' \times h') + \beta$, based on $\epsilon'$ for each of the large number of spots calculated based on historical data, an absolute dynamic topography $\eta 2$ at each of the large number of spots based on data measured by satellite, and the values $\alpha$ and $\beta$.

5 Claims, 10 Drawing Sheets

OTHER PUBLICATIONS

Tapley, B.D. et al. "Large scale ocean circulation from the Grace GGM01 Geoid", Geophysical Research Letters, vol. 30, No. 22, 2163, 2003.*

Gordon, A.L. et al. "Thermocline and Intermediate Water Communication Between the South Atlantic and Indian Oceans", Journal of Geophysical Research, vol. 97, No. C5, pp. 7223-7240, May 15, 1992.*

Grand, P.L. "Impact of Geoid Improvement on Ocean Mass and Heat Transport Estimates", Space Science Reviews 108, pp. 225-238, Kluwer Academic Publishers, 2003.*

English language version of the International Search Report (PCT/ISA/210) of the International Application PCT/JP2006/306126 (mailed on May 2, 2006).

International Preliminary Report on Patentability issued in corresponding International Patent Application No. PCT/JP2006/306126, mailed on Nov. 1, 2007.

* cited by examiner

FIG. 2

| WATER PRESSURE (db) | WATER TEMPERATURE (°C) | SALINITY (PSU) | WATER PRESSURE (db) | WATER TEMPERATURE (°C) | SALINITY (PSU) | WATER PRESSURE (db) | WATER TEMPERATURE (°C) | SALINITY (PSU) |
|---|---|---|---|---|---|---|---|---|
| 9.9 | 18.858 | 34.976 | 299.5 | 14.823 | 34.542 | 780.1 | 5.239 | 34.062 |
| 20.2 | 18.85 | 34.974 | 819.9 | 14.396 | 34.506 | 799.7 | 5.174 | 34.066 |
| 29.5 | 18.846 | 34.974 | 340.5 | 14.006 | 34.482 | 824.7 | 4.779 | 34.1 |
| 40.9 | 18.851 | 34.974 | 360.5 | 13.608 | 34.458 | 850.5 | 4.611 | 34.116 |
| 50.4 | 18.849 | 34.974 | 380.3 | 13.293 | 34.434 | 875.4 | 4.437 | 34.14 |
| 59.9 | 18.852 | 34.974 | 399.5 | 12.788 | 34.394 | 899.8 | 4.306 | 34.16 |
| 70.3 | 18.842 | 34.972 | 420.1 | 12.219 | 34.35 | 925.1 | 4.204 | 34.174 |
| 79.6 | 18.848 | 34.974 | 440.1 | 11.653 | 34.31 | 949.6 | 4.045 | 34.202 |
| 89.7 | 18.799 | 34.964 | 460.1 | 11.256 | 34.28 | 975.4 | 3.937 | 34.224 |
| 100 | 18.798 | 34.961 | 480.2 | 10.868 | 34.262 | 1000.6 | 3.828 | 34.246 |
| 110.1 | 18.789 | 34.962 | 499.8 | 10.408 | 34.22 | 1050.3 | 3.674 | 34.284 |
| 119.4 | 18.762 | 34.956 | 520.1 | 9.957 | 34.19 | 1099.7 | 3.502 | 34.316 |
| 130.1 | 18.704 | 34.938 | 540.2 | 9.372 | 34.15 | 1150.5 | 3.363 | 34.344 |
| 139.5 | 18.413 | 34.88 | 559.6 | 8.861 | 34.116 | 1199.8 | 3.267 | 34.368 |
| 149.4 | 18.25 | 34.848 | 580.7 | 8.399 | 34.09 | 1250.3 | 3.142 | 34.394 |
| 160.3 | 17.958 | 34.806 | 599.7 | 7.902 | 34.068 | 1299.5 | 3.052 | 34.414 |
| 169.9 | 17.73 | 34.772 | 620.4 | 7.59 | 34.054 | 1400.3 | 2.778 | 34.466 |
| 179.7 | 16.832 | 34.672 | 639.9 | 7.168 | 34.042 | 1499.9 | 2.616 | 34.494 |
| 189.8 | 16.629 | 34.658 | 659.2 | 6.865 | 34.028 | 1599.7 | 2.455 | 34.52 |
| 200.1 | 16.543 | 34.648 | 680.4 | 6.468 | 34.028 | 1700.4 | 2.299 | 34.542 |
| 220.2 | 16.136 | 34.62 | 700.6 | 6.223 | 34.028 | 1799.9 | 2.178 | 34.56 |
| 239.7 | 15.779 | 34.598 | 719.9 | 5.951 | 34.032 | 1899.8 | 2.072 | 34.576 |
| 259.6 | 15.403 | 34.578 | 740.2 | 5.791 | 34.036 | 1999.9 | 1.977 | 34.588 |
| 279.5 | 15.289 | 34.57 | 759.6 | 5.602 | 34.044 | | | |

FIG. 3

| WATER PRESSURE (db) | WATER TEMPERATURE (°C) | SALINITY(PSU) | WATER PRESSURE (db) | WATER TEMPERATURE (°C) | SALINITY(PSU) | WATER PRESSURE (db) | WATER TEMPERATURE (°C) | SALINITY(PSU) |
|---|---|---|---|---|---|---|---|---|
| 241 | 15.75444 | 34.59669 | 261 | 15.39498 | 34.57744 | 281 | 15.25405 | 34.5679 |
| 242 | 15.73554 | 34.59569 | 262 | 15.38925 | 34.57703 | 282 | 15.23075 | 34.5665 |
| 243 | 15.71665 | 34.59468 | 263 | 15.38352 | 34.57663 | 283 | 15.20745 | 34.5651 |
| 244 | 15.69775 | 34.59368 | 264 | 15.37779 | 34.57623 | 284 | 15.18415 | 34.5637 |
| 245 | 15.67886 | 34.59267 | 265 | 15.37207 | 34.57583 | 285 | 15.16085 | 34.5623 |
| 246 | 15.65997 | 34.59167 | 266 | 15.36634 | 34.57543 | 286 | 15.13755 | 34.5609 |
| 247 | 15.64107 | 34.59066 | 267 | 15.36061 | 34.57502 | 287 | 15.11426 | 34.5595 |
| 248 | 15.62218 | 34.58966 | 268 | 15.35488 | 34.57462 | 288 | 15.09095 | 34.5581 |
| 249 | 15.60328 | 34.58865 | 269 | 15.34915 | 34.57422 | 289 | 15.06765 | 34.5567 |
| 250 | 15.58439 | 34.58765 | 270 | 15.34342 | 34.57382 | 290 | 15.04435 | 34.5553 |
| 251 | 15.56549 | 34.58664 | 271 | 15.33769 | 34.57342 | 291 | 15.02105 | 34.5539 |
| 252 | 15.5466 | 34.58564 | 272 | 15.33197 | 34.57302 | 292 | 14.99776 | 34.5525 |
| 253 | 15.5277 | 34.58463 | 273 | 15.32624 | 34.57261 | 293 | 14.97445 | 34.5511 |
| 254 | 15.50881 | 34.58363 | 274 | 15.32051 | 34.57221 | 294 | 14.95115 | 34.5497 |
| 255 | 15.48992 | 34.58262 | 275 | 15.31478 | 34.57181 | 295 | 14.92785 | 34.5483 |
| 256 | 15.47102 | 34.58162 | 276 | 15.30905 | 34.57141 | 296 | 14.90455 | 34.5469 |
| 257 | 15.45213 | 34.58061 | 277 | 15.30332 | 34.57101 | 297 | 14.88125 | 34.5455 |
| 258 | 15.43323 | 34.57961 | 278 | 15.29759 | 34.5706 | 298 | 14.85795 | 34.5441 |
| 259 | 15.41434 | 34.5786 | 279 | 15.29186 | 34.5702 | 299 | 14.83465 | 34.5427 |
| 260 | 15.39071 | 34.57784 | 280 | 15.27735 | 34.5698 | 300 | 14.81253 | 34.54112 |

FIG. 4

| WATER PRESSURE (db) | DENSITY | WATER PRESSURE (db) | DENSITY | WATER PRESSURE (db) | DENSITY |
|---|---|---|---|---|---|
| 241 | 1025.494 | 260 | 1025.56 | 280 | 1025.584 |
| 242 | 1025.498 | 261 | 1025.561 | 281 | 1025.588 |
| 243 | 1025.501 | 262 | 1025.562 | 282 | 1025.592 |
| 244 | 1025.504 | 263 | 1025.563 | 283 | 1025.596 |
| 245 | 1025.508 | 264 | 1025.564 | 284 | 1025.6 |
| 246 | 1025.511 | 265 | 1025.565 | 285 | 1025.604 |
| 247 | 1025.515 | 266 | 1025.566 | 286 | 1025.608 |
| 248 | 1025.518 | 267 | 1025.567 | 287 | 1025.612 |
| 249 | 1025.522 | 268 | 1025.567 | 288 | 1025.616 |
| 250 | 1025.525 | 269 | 1025.568 | 289 | 1025.62 |
| 251 | 1025.529 | 270 | 1025.569 | 290 | 1025.624 |
| 252 | 1025.532 | 271 | 1025.57 | 291 | 1025.628 |
| 253 | 1025.536 | 272 | 1025.571 | 292 | 1025.632 |
| 254 | 1025.539 | 273 | 1025.572 | 293 | 1025.636 |
| 255 | 1025.543 | 274 | 1025.573 | 294 | 1025.64 |
| 256 | 1025.546 | 275 | 1025.574 | 295 | 1025.644 |
| 257 | 1025.549 | 276 | 1025.575 | 296 | 1025.648 |
| 258 | 1025.553 | 277 | 1025.576 | 297 | 1025.652 |
| 259 | 1025.556 | 278 | 1025.577 | 298 | 1025.656 |
| 260 | 1025.559 | 279 | 1025.58 | 299 | 1025.66 |

FIG. 5

| DATA NO. | 1 | 2 | 3 | 4 | 5 | 6 |
|---|---|---|---|---|---|---|
| UPPER LAYER THICKNESS h(m) | 252 | 368 | 292 | 428 | 308 | 321 |
| OBSERVATION POSITION (LATITUDE) | 29.295 | 27.713 | 29.211 | 28.757 | 27.775 | 27.83 |
| OBSERVATION POSITION (LONGITUDE) | 177.159 | 150.884 | 176.923 | 150.069 | 165.514 | 167.188 |
| UPPER LAYER DENSITY $\rho_1$ (kg/m$^{-3}$) | 1025.36 | 1024.981 | 1025.229 | 1025.264 | 1025.059 | 1025.117 |
| LOWER LAYER DENSITY $\rho_2$ (kg/m$^{-3}$) | 1027.094 | 1027.149 | 1027.102 | 1027.212 | 1027.142 | 1027.147 |
| RELATIVE DENSITY COEFFICIENT $\varepsilon$ | 0.001688 | 0.00211 | 0.001824 | 0.001896 | 0.002028 | 0.001977 |
| $\varepsilon \times h$ | 0.425478 | 0.776505 | 0.532528 | 0.811692 | 0.624631 | 0.634534 |
| ABSOLUTE DYNAMIC TOPOGRAPHY ADT(m) | 2.153644 | 2.463559 | 2.266423 | 2.365768 | 2.378841 | 2.316478 |

FIG. 7

LATITUDE / LONGITUDE

| | 150.3333° | 150.6667° | 151° | 151.3333° | 151.6667° | 152° | 152.3333° |
|---|---|---|---|---|---|---|---|
| 25.67102° | 0.001905 | 0.001904 | 0.001903 | 0.001902 | 0.001902 | 0.001903 | 0.001904 |
| 25.97107° | 0.001873 | 0.001872 | 0.001871 | 0.001871 | 0.001871 | 0.001872 | 0.001873 |
| 26.27036° | 0.001842 | 0.00184 | 0.00184 | 0.001839 | 0.001839 | 0.00184 | 0.001841 |
| 26.56888° | 0.001811 | 0.00181 | 0.00181 | 0.001809 | 0.001809 | 0.00181 | 0.001811 |
| 26.86662° | 0.001785 | 0.001784 | 0.001784 | 0.001783 | 0.001783 | 0.001784 | 0.001785 |
| 27.16359° | 0.001758 | 0.001758 | 0.001757 | 0.001757 | 0.001757 | 0.001759 | 0.00176 |

# METHOD FOR PREDICTING DEPTH DISTRIBUTION OF PREDETERMINED WATER TEMPERATURE ZONE, METHOD AND SYSTEM FOR DELIVERING FISHING GROUND PREDICTION INFORMATION OF MIGRATORY FISH

CROSS REFERENCE TO RELATED APPLICATIONS

This application claims the benefit under 35 U.S.C. section 371, of PCT International Application No. PCT/JP2006/306126, filed Mar. 27, 2006 and Japanese Application No. 2005-092593, filed Mar. 28, 2005 in Japan, the contents of which are incorporated herein by reference.

TECHNICAL FIELD

The present invention includes a depth distribution prediction method for a predetermined water temperature, a fishing ground prediction method to predict good fishing ground for migratory fish, such as bluefin and bigeye tuna, that migrate extensively through the oceans and a fishing ground prediction information delivery system for migratory fish.

BACKGROUND ART

It is very difficult to comprehend the behaviors of bluefin tuna, bigeye tuna, and other migratory fish that migrate extensively through the oceans. In order to estimate the distribution of such highly migratory fish, satellite data are used to grasp the marine environment, which affecting on fish migration.

A good fishing ground prediction information service method is known in which good catch pattern images are extracted, according to the seasons, fishing ground zones, fish species, from the past sea surface temperature images that are originated from satellite images and corresponding fishing ground information at the time of good catch, and fishing ground are predicted from an up-to-date sea surface temperature chart and fishing ground information and delivered to fishing sites (see Japanese Patent Application Laid-Open No. 2004-192231).

Further, a water temperature chart preparing method is proposed in Japanese Patent Application Laid-Open No. 2001-283189. In order to facilitate a fishing boat to utilize accurate water temperature values, a composite image without clouds is prepared from a satellite image, a base image is set as a cloud-zone reference image, and a cloud-zone identification image is generated by comparing all pixel values in a predetermined region for water temperature data with all pixel values in regions of the cloud-zone reference image. A cloudless image is prepared by removing cloud zones, and the pixel values in the cloud-zone reference image are implanted in the removed cloud zones. A complemented image is generated by complementing the pixel values in the cloud zones using the implanted pixel values and pixel values around the cloud zones while correcting the implanted pixel values.

Since the conventional fishing ground prediction method described above is based on sea surface temperature measured by satellites, it cannot clarify temperature distributions of three dimensional thermal structure of the ocean where fish inhabits. As a consequence, previous methods are reliable to predict good fishing ground.

DISCLOSURE OF THE INVENTION

The objective of the present invention is to provide a depth distribution prediction method for a predetermined water temperature, in which temperature information in a target sea area can be detected with high accuracy from a few observation data, a fishing ground prediction method for migratory fish, capable of predicting good fishing ground for highly migratory fish that migrate extensively through the ocean based on the depth distribution prediction method, and a fishing ground prediction information delivery system for migratory fish.

A depth distribution prediction method for a predetermined water temperature according to the present invention comprises a step of determining depth h from the sea surface to predetermined water temperature depth and density $\rho 1$ and $\rho 2$ for upper and lower layers above and below h, based on observation data including water temperature, salinity, and water depth measured at many observation spots in a target sea area, a step of calculating a relative density coefficient $\epsilon = (\rho 2 - \rho 1)/\rho 2$ and $\epsilon \times h$ for many observation spots and obtaining an absolute dynamic topography $\eta 1$ at each observation spot based on data measured by satellite, a step of preparing a scatter diagram for every observation spot, based on an ordinate axis which represents the obtained absolute dynamic topography $\eta 1$ and an abscissa axis which represents $\epsilon \times h$, and determining a slope $\alpha$ and the intercept $\beta$ from regression linear equation, $\eta 1 = \alpha(\epsilon \times h) + \beta$, a step of calculating a relative density coefficient $\epsilon'$ for each of a large number of spots in the target sea area, based on past data for water temperature, salinity, and water depth, and obtaining an absolute dynamic topography $\eta 2$ at each of the large number of spots based on data measured by satellite, and a step to determining, the absolute dynamic topography $\eta 2$, depth $h'$ of predetermined water temperature at large number of spots, based on an equation, $\eta 2 = \alpha(\epsilon' \times h') + \beta$, thereby obtaining a depth distribution of the predetermined water temperature in the entire target sea area.

In a fishing ground prediction method for migratory fish according to the invention, a good fishing ground for migratory fish which migrate in a predetermined water temperature is predicted by using the depth distribution prediction method for the predetermined water temperature as described above.

A fishing ground prediction information delivery system for migratory fish according to the invention comprises procedure acquiring an absolute dynamic topography $\eta 1$ at each of many of observation spots in a target sea area and an absolute dynamic topography $\eta 2$ at each of a large number of spots in the target sea area, based on data measured by satellite, observation data including water temperature, salinity and water depth measured at many observation spots, past data for water temperature, salinity and water depth at the large number of spots in the target sea area, procedure determining a depth h from a sea surface to depth a predetermined water temperature depth at an observation spot and density $\rho 1$ and $\rho 2$ of upper and lower layers above and below h, based on the observation data, calculating a relative density coefficient $\epsilon = (\rho 2 - \rho 1)/\rho 2$ and $\epsilon \times h$, determining the slope $\alpha$ and the intercept $\beta$ in an approximate linear equation, $\eta 1 = \alpha(\epsilon \times h) + \beta$, from a scatter diagram based on many observation data an ordinate axis which represents $\eta 1$ and an abscissa axis which represents $\epsilon \times h$, calculating a relative density coefficient $\epsilon'$ based on the past data, and calculating a depth $h'$ of a predetermined water temperature at each of the large number of spots, based on an equation, $\eta 2 = \alpha(\epsilon' \times h') + \beta$, carrying our imaging of a depth distribution of a predetermined water temperature in the entire target sea area, based on the depth h and h' in the predetermined water temperatures at the large number of spots, and procedure delivering the resulting image, as a fishing ground prediction for migratory fish which migrate in the predetermined water temperature, to sites of fishing ground.

A fishing ground prediction information delivery system for migratory fish according to the invention comprises a receiving station, a central processing unit, and a transmitter section. The receiving station is configured to acquire an absolute dynamic topography $\eta 1$ from numerous observation spots in a target area and an absolute dynamic topography $\eta 2$ at each of a large number of spots in the target sea area, based on data measured by satellite, observation data including water temperature, salinity and water depth measured at the plurality of observation spots, past data for water temperature, salinity and water depth at the large number of spots. The central processing unit includes observation spot data calculating procedure determining a depth h from a sea surface to a water zone of a predetermined water temperature at an observation spot and respective densities $\rho 1$ and $\rho 2$ of upper and lower layers above and below the water zone, based on the observation data, and calculating a relative density coefficient $\epsilon=(\rho 2-\rho 1)/\rho 2$ and $\epsilon \times h$, scatter diagram processing procedure preparing a scatter diagram for every observation spot, based on an ordinate axis which represents $\eta 1$ and an horizontal axis which represents $\epsilon \times h$, and determining slope $\alpha$ and the intercept $\beta$ for the approximate linear equation, $\eta 1=\alpha(\epsilon \times h)+\beta$, and multi-spot data calculating procedure calculating a relative density coefficient $\epsilon'$ based on the past data and calculating a depth h' of a predetermined water temperature at each of the large number of spots, based on an equation, $\eta 2=\alpha(\epsilon' \times h')+\beta$. Further, the transmitter section is configured to deliver, as a fishing ground prediction for migratory fish which migrate in a predetermined water temperature, a depth distribution of the predetermined water temperature in the entire target sea area, based on the depth h and h' in the predetermined water temperature at the large number of spots, to fishing vessels.

The central processing unit may be provided with an image processor section for carrying out imaging of the depth distribution of the predetermined water temperature so that the transmitter section delivers the resulting image.

Argo floats are used to observe water temperature, salinity, and pressure. The Argo floats are profiling floats that are spread in the world ocean due to the Argo project and designed to emerge at the sea surface at predetermined time intervals (about a week or two). During the time intervals, the vertical distribution of water temperature and salinity in areas ranging from predetermined depth (of several hundreds to 2,000 meters) to the sea surface are measured. After the emergence, data are transmitted through a polar-orbiting environmental weather satellite NOAA. Since the Argo floats are limited in number and are not sufficient to monitor temperature distributions in an extended area.

Further, temperature data obtained from expendable bathy thermograph (XBT) provided by the Japan Oceanographic Data Center (JODC) may also be used as the source of the observation data.

Monthly mean objective analysis data from the World Ocean Atlas 2001 were used as the past data for the water temperature, salinity, and water depth. The data of the World Ocean Atlas are the data which have been processed measured temperature and salinity at specific water depth and provide historical data base analyzing the measured data. Therefore, the data of the World Ocean Atlas do not provide the depth of current predetermined water temperature.

The absolute dynamic topography (ADT) is a difference between the respective heights of an actual sea surface and a geoid surface.

The height of the sea surface is determined by so-called satellite altimeter that measures the height based on the time that elapses from directly downward emitting of microwave pulse from satellite to returning of the microwave pulse reflected by the sea surface to the satellite.

The geoid surface is an equipotential surface of gravity which corresponds to the zero height, which can be estimated by using a gravitational field model based on the satellite CHAMP. Since the oceans involve ocean currents, waves, tides, etc., a deviation is caused between the actual sea surface and the geoid surface.

The above absolute dynamic topography is provided by the French Group for Analysis, Validation and Investigation of Satellite Oceanography (AVISO) through the Internet.

According to the present invention, the water temperature distribution in the entire target sea area can be detected relatively accurately from a few actual measurement data, so that good fisher ground for migratory fish that migrate in specific water temperature can be predicted with high accuracy and delivered.

BRIEF DESCRIPTION OF THE DRAWINGS

FIG. 2 is an example observation data set obtained from Argo floats;

FIG. 3 is an example observation data set that are interpolated at every meter;

FIG. 4 is a list of interpolated density at one meter interval;

FIG. 5 is an example data set obtained in some of observation spots;

FIG. 7 is an example list of relative density coefficients calculated from WOA 2001 data;

BEST MODE FOR CARRYING OUT THE INVENTION

Figure 1:
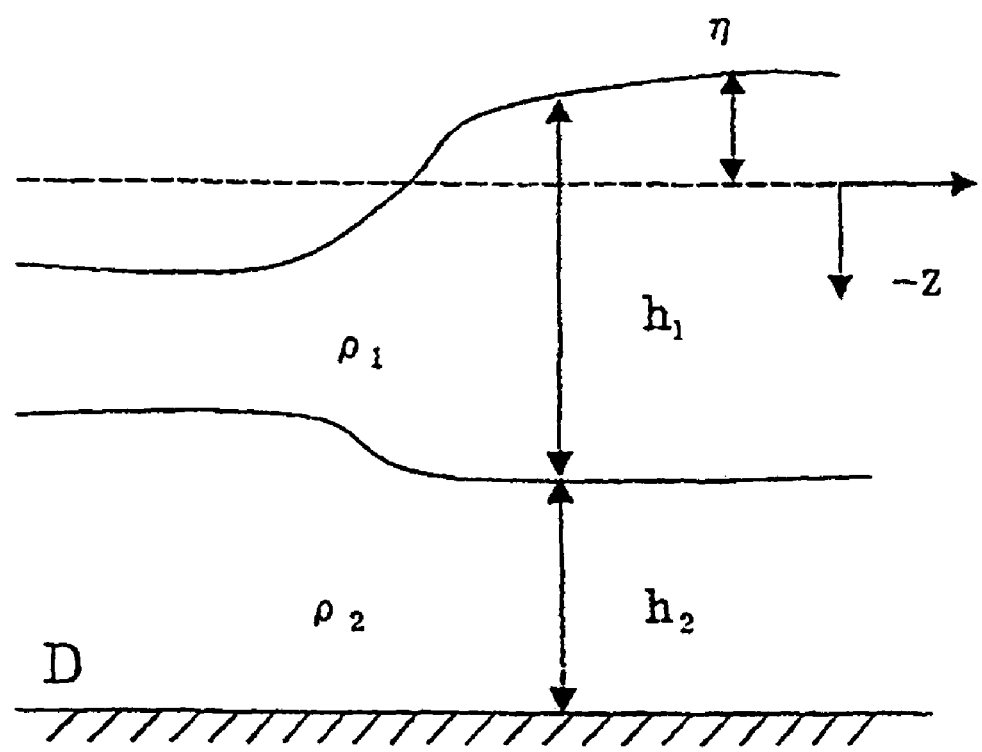
FIG. 1 is a schematic view showing a two-layer structure of ocean.

As shown in FIG. 1, oceanic density structure is assumed to be a two-layer system. An absolute dynamic topography $\eta$ is the sum of a deviation of a dynamic topography from a mean sea level due to a barotropic flow and a deviation of a dynamic topography from a mean sea level due to a baroclinic flow from the mean sea level.

Further, it is supposed that a baroclinic flow exists in the upper layer and barotropic components of a vertically fixed horizontal pressure gradient exist in both layers.

The deviation of the dynamic topography based on the baroclinic flow from the mean sea level is obtained from a hydrostatic pressure equation in the lower layer.

If a depth from sea surface parallel to an isobaric surface to the bottom under a static pressure is D, and if the thickness and density of the upper and lower layer are h1, h2 and $\rho 1$, $\rho 2$, respectively, then a pressure P2 in a position of water depth z (− is used to represent a level under 0 for a mean sea level so that z=−100 m is given for a water depth of 100 m, for example) in the lower layer is $$P2 = \rho1 \cdot g \cdot h1 + \rho2 \cdot g[h2-(D+z)]. \quad (1)$$

If the above equation (1) that represents the pressure in the lower layer is rewritten into a pressure equation (pressure=density×gravitational acceleration×height in water) with the uniform density ρ2, we obtain $$P2 = \rho2 \cdot g[(\rho1/\rho2)h1 + h2 - D - z]. \quad (1')$$

The temporal variation of the height in water thus obtained can be regarded as being attributable to the barotropic flow.

A deviation B of the dynamic topography based on the barotropic flow from the mean sea level (z=0) is $$B = (\rho1/\rho2)h1 + h2 - D. \quad (2)$$

Further, the deviation of the dynamic topography from the mean sea level, i.e., the absolute dynamic topography η, can be expressed as:

$$\eta = h1 + h2 - D. \quad (3)$$

Based on the above equations (2) and (3), the relation between the absolute dynamic topography η and the upper layer thickness h1 can be given by $$\eta = h1 - (\rho1/\rho2)h1 + B \quad (4)$$
$$= [(\rho2 - \rho1)/\rho2] \times h1 + B$$
$$= \varepsilon \times h1 + B.$$

Here ε=(ρ2−ρ1)/ρ2 is given.

The density ρ1 and ρ2 can be computed from temperature, salinity, and pressure. In this case, ε is a relative density coefficient, which changes little in some sea areas in some seasons.

Actually, ocean is not a two layer system like the one shown in FIG. 1, and a reference level at the absolute dynamic topography is different from a reference plane for the calculation of the relative density coefficient ε. If this two-layer model is applied to the real ocean, the above equation (4) should be transformed as follows:

$$\eta(T) = \alpha\{\varepsilon(T) \times h(T)\} + \beta, \quad (4')$$

where η(T) is an absolute dynamic topography, h(T) is a depth to a predetermined water temperature, and α and β are unknown coefficients.

Although the equation (4') works well for high water temperature above 17° C., data are subject to relatively large variations. In obtaining a relative density coefficient ε' for each of a large number of spots, it can be approximated by past monthly mean data from the World Ocean Atlas 2001, since the relative density coefficient ε changes little in some sea areas in some seasons.

A distribution diagram may be prepared for all measurement spots. In this diagram, the abscissa axis represents the product (ε×h) of a depth h in a predetermined water temperature obtained from observation data, and the ordinate axis represents an absolute dynamic topography η1 at the observation spot concerned, obtained from measured data from satellite. Based on this diagram, the unknown coefficient α and β in the equation (4') can be obtained from linear regression analysis.

Then, relative density coefficients ε' are obtained, with a depth near the predetermined water temperature, from the past data for a large number of spots in a target sea area, and an absolute dynamic topography η2 is obtained for each of the many spots based on data from satellite.

Further, the determined values ε' and η2 are applied to the equation (4'), as follows.

$$\eta2 = \alpha(\varepsilon' \times h') + \beta.$$

Based on this, a depth h' of the predetermined water temperature can be obtained at each of the many spots. If this operation is performed for the entire target sea area, a water depth distribution can be obtained for the predetermined water temperature in the entire target sea area.

In consequence, the distribution of predetermined water temperature may be influence the distribution of migratory fish directly or indirectly, so that good fishing ground for migratory fish in the target sea area can be predicted.

The following is a description of a fishing ground prediction method for migratory fish, e.g., bigeye tuna that are relatively high commercial value.

Water temperature in which migratory fish migrate vary depending on the species of fish. According to a research using archival tags, bigeye tuna swims at a depth of near 100 m in night and near a greater depth of 300 m in the daytime. Since the environmental water temperature at which the tuna swim in the deep sea is about 15° C., the water temperature for the boundary between the upper and lower layers is set to 15° C.

In order to compare the actual fishing catches of bigeye tuna with an anticipated fishing ground, and a sea area located at latitude 20 to 30 degrees north and longitude 150 to 180 degrees east were selected as target sea areas.

102 Argo float data sets, the data were obtained on Apr. 10, 2002, were used as observation data.

Observation data as shown in FIG. 2, for example, were delivered by a certain Argo float located at latitude 29.20° north and longitude 176.923° east.

The individual Argo float data were subjected to interpolation, whereupon water temperature and salinity data were obtained at every 1 m depth. FIG. 3 shows data for water depth between 241 m to 300 m. It was supposed that the data increase by 1 db for every increase of the water depth of 1 m. In this observation position of Argo float, as seen from FIG. 3, the depth from the sea surface to a water temperature of 15° C., a boundary water temperature, is 292 m at which the temperature is nearest to 15° C.

A density was obtained for each water depth of 1 m based on the interpolated water temperature and salinity data. FIG. 4 shows densities calculated according to the data shown in FIG. 3. A formula for determining the densities is in compliance with UNESCO 1983 (Algorithms for computations of fundamental properties of seawater, 1983).

Based on each obtained density (FIG. 4) for each 1 m, the mean density ρ1 of the upper layer that was located shallower than the depth for 15° C. and the mean density ρ2 of the deeper or lower layer were determined. Further, the relative density coefficient ε(=(ρ2−ρ1)/ρ2) was obtained from ρ2 and ρ1. At observation spots corresponding to the data shown in FIGS. 3 and 4, for example, h=292 m, ρ1=1,025.2 kg/m$^{-3}$, ρ2=1,027.1 kg/m$^{-3}$, and ε=0.0018 were obtained.

Since the density changes little at water depth greater than a fixed value, what is required is only obtaining the mean density of the lower layer within the range of observation.

For the observation spots based on the 102 Argo floats, ε×h is obtained and their absolute dynamic topography (ADT) is examined. The absolute dynamic topography data are gridded in ⅓° latitude by ⅓° longitude.

FIG. 5 shows the results obtained for some of the observation spots.

Figure 6:
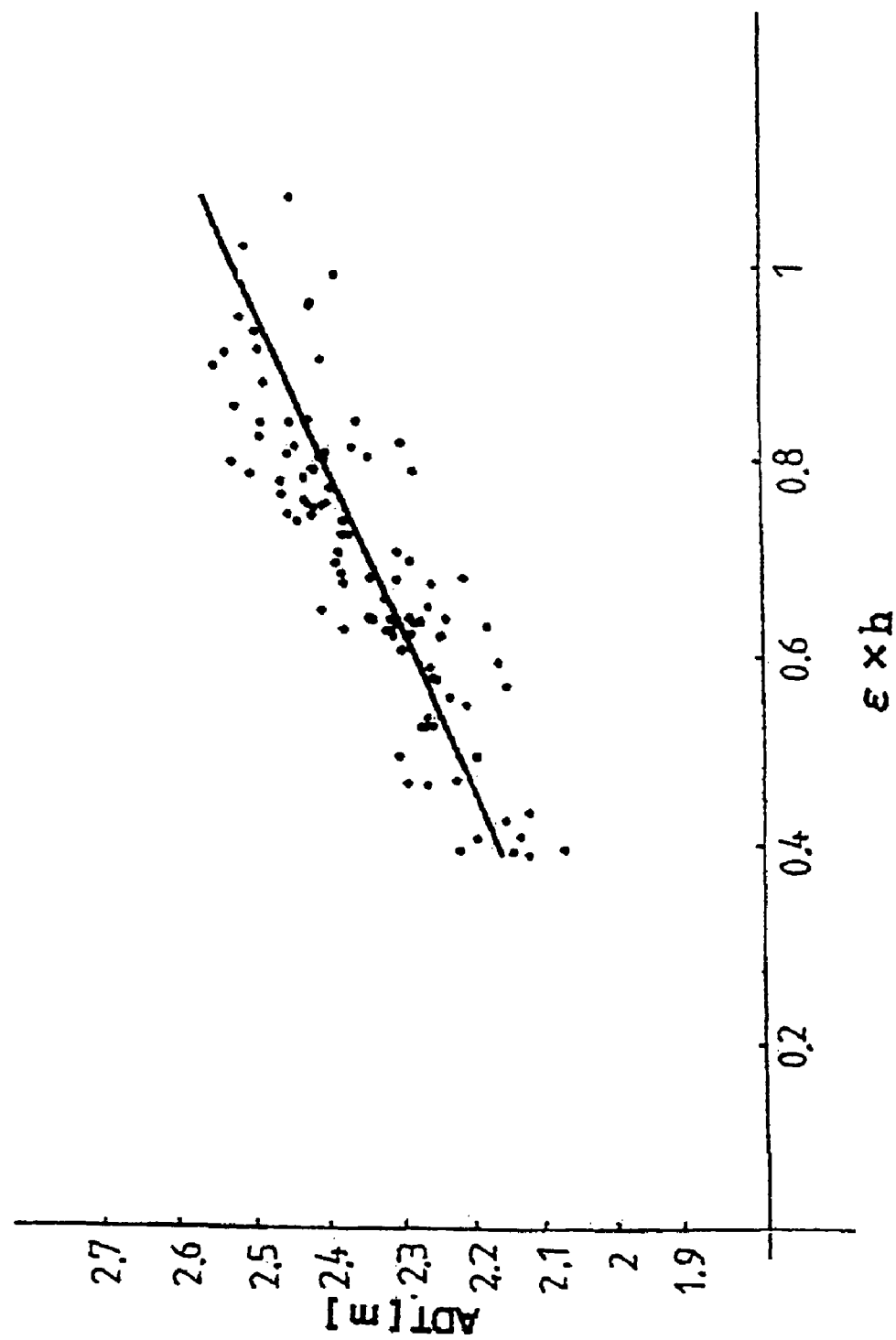
FIG. 6 is a scatter diagram, in which the ordinate axis represents an absolute dynamic topography and the abscissa axis represents $\epsilon \times h$.

As shown in FIG. 6, the data (dots) are displayed in a rectangular coordinate system, of which the abscissa axis represents ϵ×h that is calculated for observation spots based on the 102 Argo floats and the ordinate axis represents the examined absolute dynamic topography (ADT) η1. Then, the approximate linear equation is obtained from these data. As a result, the slope α of the straight line was 0.60287, and the intercept β on the ordinate axis was 1.9246.

Thus, it was found that, in this target sea area during the experiment the following relation between ϵ×h and η is derived for 15° C. water:

$$\eta=0.60287(\epsilon \times h)+1.9246$$

Objective analysis data of WOA01 was used as the past data. This data set is a collection of past observed data, in which the water temperature and salinity at a reference water depth obtained by averaging for each month are given in a grid of 1° latitude by 1° longitude.

The past the same month data for the target sea area were subjected to interpolation, data on water temperature and salinity at sections between water depth 1 and 1,500 m were prepared for depth intervals of 1 m, and from these data, densities for the depth intervals of 1 m were calculated. The respective densities ρ1 and ρ2 of the upper and lower layers were determined based on a water depth indicative of the water temperature nearest to the boundary water temperature of 15° C., and relative density coefficients ϵ' were calculated individually for all grids (1° latitude by 1° longitude). FIG. 7 shows some of the coefficients ϵ' obtained in this manner.

Further, the absolute dynamic topography η2 of each of spots corresponding to the WOA01 data was examined, and the examined η2 and the calculated ϵ' were applied to $$\eta 2=0.60287(\epsilon' \times h')+1.9246,$$

whereby the depth h' to the water temperature of 15° C. was obtained for any of the grids.

In a grid at latitude 26.27036 degrees north and longitude 151 degrees east, for example, the absolute dynamic topography η2 and the relative density coefficient ϵ' are 2.294666 m and 0.00184 (FIG. 7), respectively, so that h'=333.17 m can be obtained from:

$$2.294666=0.603(0.00184 \times h')+1.925.$$

Figure 8:
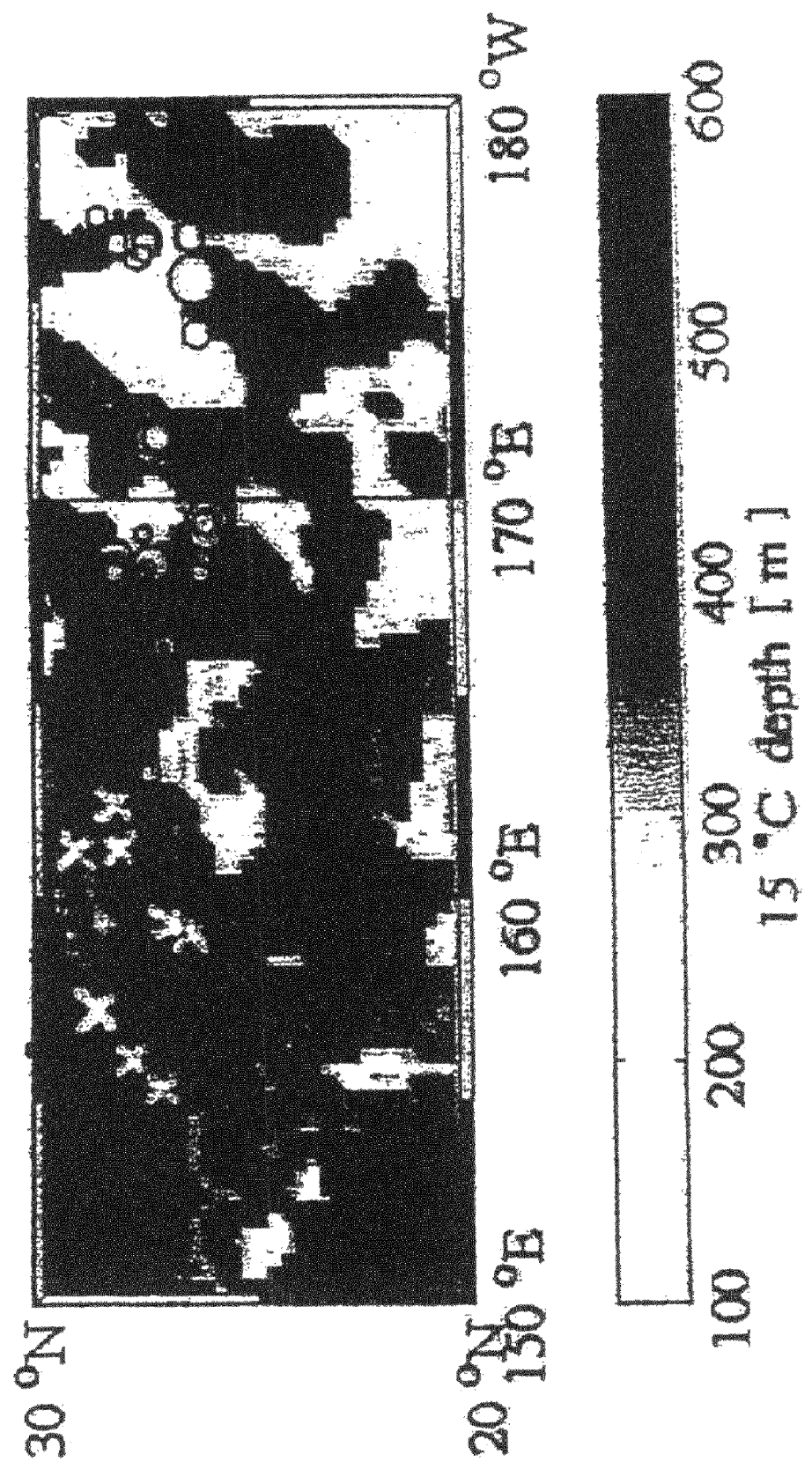
FIG. 8 shows the depth distribution of 15° C. water.

The water depth distribution for the water temperature of 15° C. in the entire target sea area is obtained and then imaging of this water depth distribution is carried out. In FIG. 8, a water depth distribution for the water temperature of 15° C. in a target sea area of Apr. 10, 2002 is discriminated by color.

Further, sea areas at depth of 300 m±20 m for the water temperature of 15° C., where the catch rate of bigeye tuna was particularly high, are hatched.

In FIG. 8, this image is overlapped for comparison by the catches of bigeye tuna during one week starting on Apr. 10, 2002.

The bigeye tuna catch is based on Tuna Longline Fishing ground Bulletin 2002 (Kesen-numa City, Miyagi Prefecture, Japan) from the Fishing ground Information Service Center. The operation is performed once a day for each fishing-boat and the total number of operations is 2,414. Further, comparison was made for each operation with use of each value obtained by dividing the number of fishhooks by the number of fishes caught.

In FIG. 8, "o" represent operation positions in which bigeye tuna are caught, while "x" represent positions in which none are caught.

As seen from FIG. 8, bigeye tuna are intensively caught in sea areas at depth of 300 m±20 m for the water temperature of 15° C. Further, it can be guessed that a high catch could have been obtained in the hatched sea areas other than those areas in which operations were actually performed.

Although a fishing ground forecast can be displayed in a coordinate axis system of latitude and longitude, a fishing ground forecast for a wide sea area can be recognized at a glance if it is shown by a diagram separated by color or the like, as shown in FIG. 8.

Further, for species of fish that differ in swimming water depth despite the same water temperature of 15° C., corresponding water depth may be shown by an image. For fish that migrate in areas of different water temperatures, furthermore, it is necessary only that the water depth distribution be obtained with respect to the water temperature concerned.

Furthermore, only about 15 to 20 observation spots can ensure practically good accuracy.

Figure 9:
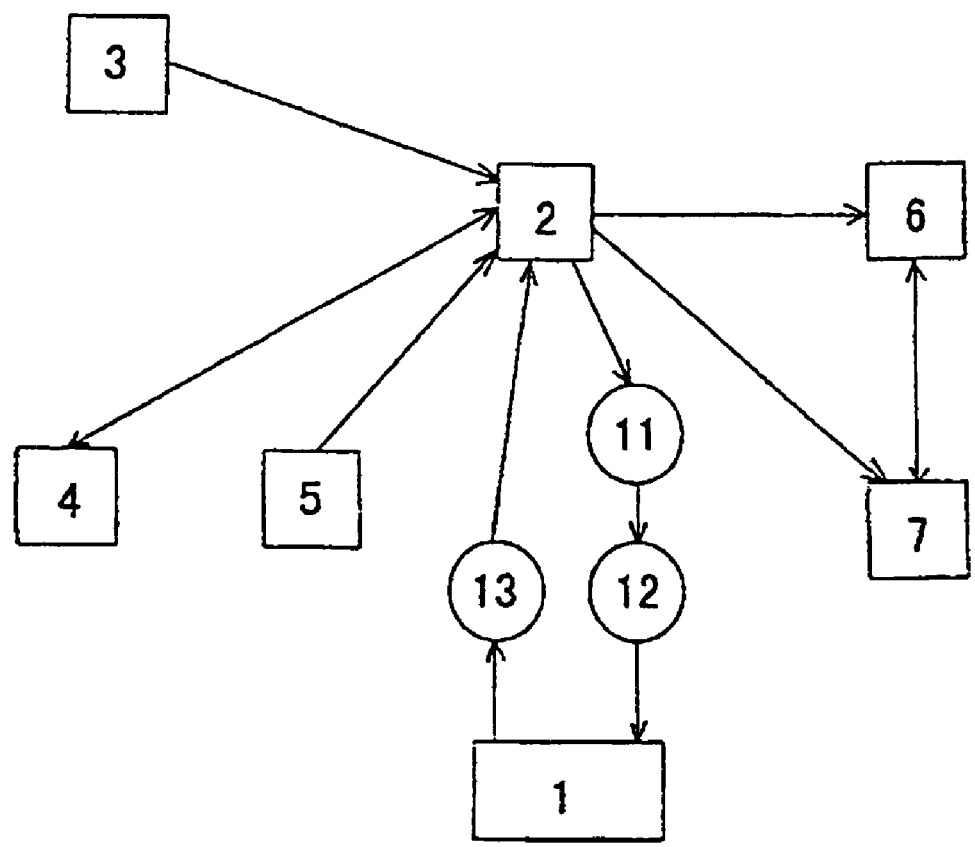
FIG. 9 is a block diagram showing a fishing ground prediction information delivery system for migratory fish.
Figure 10:
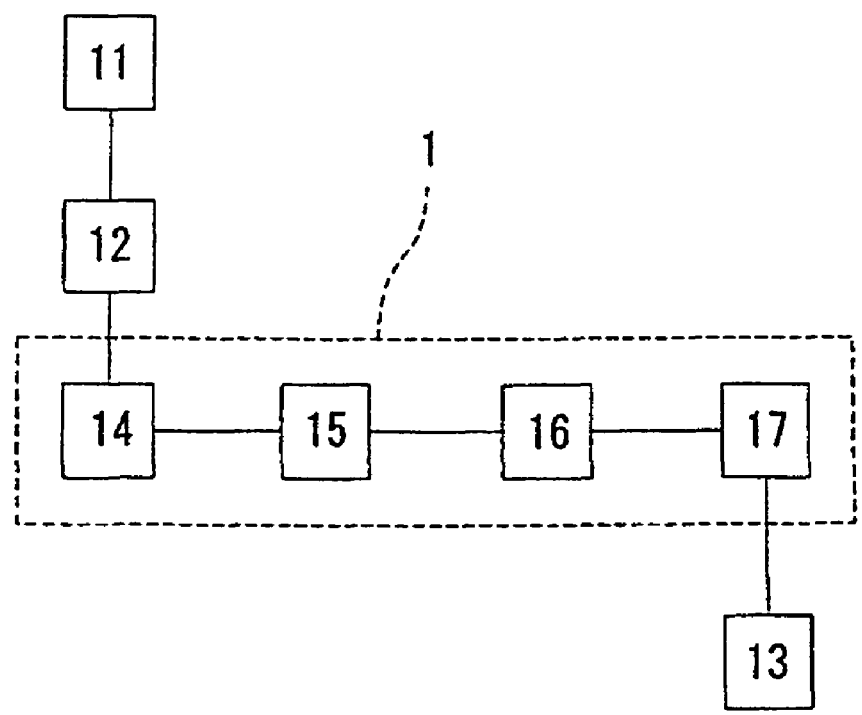
FIG. 10 is a block diagram showing a central processing unit in the system of FIG. 9 and its peripheral equipment.
Figure 11:
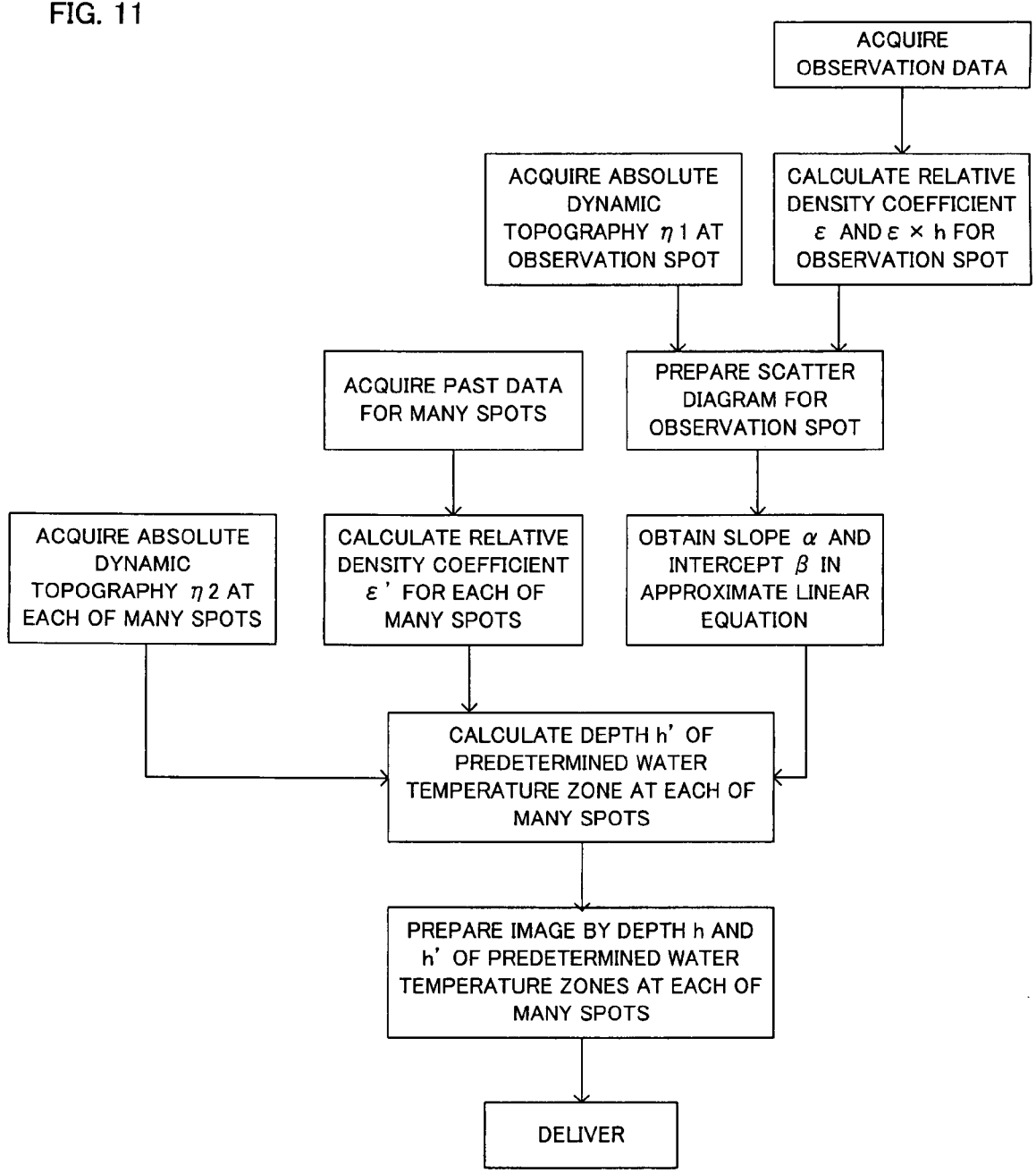
FIG. 11 is a flowchart illustrating fishing ground prediction information delivery for migratory fish according to the present invention.

FIGS. 9 to 11 illustrate the system configuration diagrams of the fishing ground prediction information delivery system for migratory fish. FIG. 9 is a block diagram showing the fishing ground prediction information delivery system, FIG. 10 is a block diagram showing a central processing unit and its peripheral equipment, and FIG. 11 is a flowchart of fishing ground prediction information delivery processing for migratory fish.

In FIG. 9, reference numeral 1 denotes the central processing unit; 2, satellite, 3, observed value provider (Argo float), 4, absolute dynamic topography provider (AVISO), 5, historical data source (World Ocean Atlas 2001), 6, fishing ground cooperative association, 7, fishing-boat, 11, receiving station, 12, input section, and 13, transmitter section. Although the satellite 2 actually includes several communication and weather satellites, it is illustrated as a single unit for the sake of convenience.

Observation data for water temperature, salinity, and water depth are transmitted to satellite 2 from a large number of observed data source 3 that are arranged in various sea areas. Based on the data observed by the satellite 2, moreover, the absolute dynamic topography provider 4 calculates the absolute dynamic topography in each of the various sea areas and delivers the results of the calculation.

Further, the historical data source 5 provides past data for the water temperature and salinity at the reference water depth in each of the various sea areas.

As shown in FIG. 9, the receiving station 11 acquires data on a water depth h1 and a salinity from the sea surface to the predetermined water temperature in the target sea area, from among various observation data delivered from the satellite 2, and sends them to the central processing unit 1 through the input section 12. Further, the receiving station 11 acquires the absolute dynamic topography η1 at the observation spot of each observed value provider 3, from among absolute dynamic topographies delivered from the satellite 2, and send them to the central processing unit 1 through the input section 12.

As shown in FIG. 10, the central processing unit 1 is composed of observation spot data calculating means 14, scatter diagram processing means 15, multi-spot data calculating means 16, and image processor section 17.

Based on the acquired observation data, as shown in FIG. 11, the observation spot data calculating means 14 of the central processing unit 1 obtains the densities ρ1 and ρ2 of the upper and lower layers above and below the predetermined water temperature at the observation spot concerned and calculates the relative density coefficient $\epsilon=(\rho2-\rho1)/\rho2$ and $\epsilon \times h1$.

The scatter diagram processing means 15 prepares scatter diagrams for all the observation spots, based on an ordinate axis that represents the absolute dynamic topography $\eta1$ at the observation spot concerned and an abscissa axis that represents $\epsilon \times h1$, and obtains the slope $\alpha$ and the intercept $\beta$ from regression analysis.

Further, the receiving station 11 extracts and acquires water temperature and salinity from the sea surface to the predetermined water temperature at a large number of other spots at times when observations were carried out, from among various data delivered from the historical data source 5, and sends them to the central processing unit 1 through the input section 12.

Furthermore, the receiving station 11 acquires the absolute dynamic topography $\eta2$ at each of a large number of spots corresponding to the past data, from among various data on absolute dynamic topography delivered from the satellite 2, and sends them to the central processing unit 1 through the input section 12.

Based on the acquired historical data, the multi-spot data calculating means 16 of the central processing unit 1 obtains the relative density coefficient $\epsilon'$ for each of the spots.

Then, the multi-spot data calculating means 16 obtains the depth h' of the water zone of the predetermined water temperature at each of the various spots from $\eta2=\alpha(\epsilon' \times h')+\beta$.

Based on the depth h of the predetermined water temperature in each of the observation spots acquired from the observation data and the depth h' of the predetermined water temperature at each of the obtained various spots, moreover, the image processor section 17 of the central processing unit 1 carries out imaging of the depth of the predetermined water temperature in the entire target sea area. Then, the resulting image is delivered, as a fishing ground prediction for migratory fish that migrate in the predetermined water temperatures, from the transmitter section 13 to the sites of fishing ground (fishing ground cooperative association 6 and fisher-boat 7) through the satellite 2.

Based on the delivered image, in some cases, the fishing ground cooperative association 6 may transmit the fishing ground prediction to the fishing-boat 7 by radio communication or the like.

If the fishing ground prediction is represented by numerical values in a coordinate axis system, moreover, it is not necessary to carry out imaging of the depth of the predetermined water temperature.

The invention claimed is:

1. A depth distribution prediction method implemented on a computer for a predetermined water temperature, comprising:

determining a depth h from the sea surface to a water zone of a predetermined water temperature and respective densities $\rho1$ and $\rho2$ of upper and lower layers above and below the water zone, based on observation data including water temperature, salinity, and water depth measured at numerous observation spots in a target sea area;

calculating a relative density coefficient $\epsilon=(\rho2-\rho1)/\rho2$ and $\epsilon \times h$ for each observation spot and obtaining an absolute dynamic topography $\eta1$ at each observation spot based on data measured by satellite;

preparing a scatter diagram for every observation spot, based on an ordinate axis which represents the obtained absolute dynamic topography $\eta1$ and an abscissa axis which represents $\epsilon \times h$, and determining the slope $\alpha$ and the intercept $\beta$ from a linear regression equation, $\eta1=\alpha(\epsilon \times h)+\beta$;

calculating a relative density coefficient $\epsilon'$ for each of many spots in the target sea area, based on historical data for water temperature, salinity, and water depth, and obtaining an absolute dynamic topography $\eta2$ at each of the many spots based on data measured by satellite; and determining, for the absolute dynamic topography $\eta2$ thus obtained, a depth h' of a water zone of a predetermined water temperature at each of the many spots, based on an equation, $\eta2=\alpha(\epsilon' \times h')+\beta$, thereby obtaining a depth distribution of the predetermined water temperature in the entire target sea area.

2. A fishing ground prediction method for migratory fish for predicting a good fishing ground for migratory fish which migrate in a predetermined water temperature by using the depth distribution prediction method for the predetermined water temperature according to claim 1.

3. A fishing ground prediction information delivery system for migratory fish, comprising:

means for acquiring observation data on water temperature, salinity and water depth measured at a plurality of observation spots in a target sea area, past data on water temperature, salinity and water depth at a large number of spots in the target sea area, and an absolute dynamic topography $\eta1$ at each of a plurality of observation spots in a target sea area and an absolute dynamic topography $\eta2$ at each of the large number of spots in the target sea area which were measured by satellite;

means for determining a depth h from a sea surface to a water zone of a predetermined water temperature at each observation spot and respective densities $\rho1$ and $\rho2$ of upper and lower layers above and below the water zone, based on the observation data, calculating a relative density coefficient $\epsilon=(\rho2-\rho1)/\rho2$ and $\epsilon \times h$, determining a slope $\alpha$ and a intercept $\beta$ from the linear regression equation, $\eta1=\alpha(\epsilon \times h)+\beta$, based on an ordinate axis which represents $\eta1$ and an abscissa axis which represents $\epsilon \times h$, calculating a relative density coefficient $\epsilon'$ based on the past data, and calculating a depth h' of a water zone of a predetermined water temperature at each of the large number of spots, based on an equation, $\eta2=\alpha(\epsilon' \times h')++\beta$;

means for carrying out imaging of a depth distribution of a predetermined water temperature in the entire target sea area, based on the depth h and h' of the predetermined water temperature at the large number of spots; and means for delivering the resulting image, as a fishing ground prediction for migratory fish which migrate in the predetermined water temperature, to a fishing ground site.

4. A fishery prediction information delivery system for migratory fish, comprising a receiver section, a central processing unit, and a transmitter section, wherein said receiver section is configured to acquire means for acquiring observation data on water temperature, salinity and water depth measured at a plurality of observation spots in a target sea area, past data on water temperature, salinity and water depth at a large number of spots in the target sea area, and an absolute dynamic topography $\eta1$ at each of the plurality of observation spots in a target sea area and an absolute dynamic topography $\eta2$ at each of the large number of spots in the target sea area which were measured by satellite, said central processing unit includes observation spot data calculating means for determining a depth h from a sea surface to a water zone of a predetermined water temperature at each observation spot and respective densities $\rho 1$ and $\rho 2$ of upper and lower layers above and below the water zone, based on the observation data, and calculating a relative density coefficient $\epsilon = (\rho 2 - \rho 1)/\rho 2$ and $\epsilon \times h$, scatter diagram processing means for preparing a scatter diagram for every observation spot, based on an ordinate axis which represents $\eta 1$ and an abscissa axis which represents $\epsilon \times h$, and determining the slope $\alpha$ and the intercept $\beta$ from the linear regression equation, $\eta 1 = \alpha (\epsilon \times h) + \beta$, multi-spot data calculating means for calculating a relative density coefficient $\epsilon'$ based on the past data and calculating a depth h' of a predetermined water temperature at each of the large number of spots, based on an equation, $\eta 2 = \alpha (\epsilon' \times h') + \beta$, and said transmitter section is configured to deliver, as a fishing ground prediction for migratory fish which migrate in a predetermined water temperature, a depth distribution of the predetermined water temperature in the entire target sea area, based on the depth h and h' of the predetermined water temperature at the large number of spots, to a fishing ground site.

5. The fishing ground prediction information delivery system for migratory fish according to claim 4, wherein said central processing unit is provided with an image processor section for carrying out imaging of the depth distribution of the predetermined water temperature so that said transmitter section delivers the resulting image.

\* \* \* \* \*

UNITED STATES PATENT AND TRADEMARK OFFICE
CERTIFICATE OF CORRECTION

| | | |
|---|---|---|
| PATENT NO. | : 7,818,280 B2 | Page 1 of 1 |
| APPLICATION NO. | : 11/887656 | |
| DATED | : October 19, 2010 | |
| INVENTOR(S) | : Hidekatsu Yamazaki et al. | |

It is certified that error appears in the above-identified patent and that said Letters Patent is hereby corrected as shown below:

Column 10, Line 44, change "$\eta 2=\alpha(\epsilon'xh')++\beta$" to -- $\eta 2=\alpha(\epsilon'xh')+\beta$ --.

Signed and Sealed this
Twenty-second Day of February, 2011

David J. Kappos
*Director of the United States Patent and Trademark Office*